United States Patent Office 3,642,693
Patented Feb. 15, 1972

3,642,693
METHODS FOR PREPARING ORGANOPOLY-
SILOXANES USING GROUP II-A METAL
HYDROLYSIS CATALYSTS
Amy L. Jasinski, Reston, Va., assignor to
Owens-Illinois, Inc.
No Drawing. Filed Apr. 8, 1968, Ser. No. 719,709
Int. Cl. C08f 11/04
U.S. Cl. 260—46.5 R                                      16 Claims

ABSTRACT OF THE DISCLOSURE

Methods for hydrolyzing trifunctional organic silanes such as methyltrialkoxysilane, phenyltrialkoxysilane, or mixtures thereof using a Group II-A metal-containing hydrolysis catalyst such as barium hydroxide or calcium hydroxide. The resultant heat curable, solvent-soluble prepolymer is used to prepare excellent laminates, high temperature stable electric insulations, moldings, and hard, clear, flexible coatings.

---

The present invention relates to methods of hydrolyzing methyltrialkoxysilane, phenyltrialkoxysilane or mixtures of phenyltrialkoxysilane and methyltrialkoxysilane using Group II-A metal-containing hydrolysis catalysts to provide organic solvent-soluble, further curable organopolysiloxane prepolymers and thermoset organopolysiloxanes prepared therefrom.

In the past, it has been difficult to hydrolyze and condense in a reproducible manner organic trifunctional silanes such as methyltrialkoxysilane, phenyltrialkoxysilane and mixtures of methyltrialkoxysilane and phenyltrialkoxysilane by an acid-catalyzed hydrolysis or a base-catalyzed hydrolysis. The amount of acid catalyst such as hydrochloric acid or the amount of base catalyst such as potassium hydroxide employed had to be quite carefully controlled and a slight deviation from an exact prescribed amount as a result of an inadvertent mistake or error oftentimes caused a large variation in the polymer product. The reactions of such hydrolysis and condensation are quite fast and sensitive and in general they cannot be easily controlled.

Accordingly, it is an object of the present invention to provide reproducible and economical methods of controllably hydrolyzing methyltrialkoxysilane, phenyltrialkoxysilane and mixtures of phenyltrialkoxysilane and methyltrialkoxysilane employing Group II-A metal hydrolysis catalysts such as barium hydroxide and calcium hydroxide.

It is an object of the present invention to provide a method of controlling the hydrolysis of methyltrialkoxysilane, phenyltrialkoxysilane and mixtures of phenyltrialkoxysilane and methyltrialkoxysilane by employing a Group II-A metal-containing hydrolysis catalyst such as barium hydroxide, calcium hydroxide or strontium hydroxide.

It is an object of the present invention to provide a method of hydrolyzing methyltrialkoxysilane, phenyltrialkoxysilane and mixtures of phenyltrialkoxysilane and methyltrialkoxysilane and preparing a solvent-soluble, further curable organopolysiloxane prepolymer therefrom, the method including (A) heating a mixture of
   (1) methyltrialkoxysilane, phenyltrialkoxysilane, or a mixture of phenyltrialkoxysilane and methyltrialkoxysilane in which the alkoxy group has from 1 to 6 carbon atoms;
   (2) an effective amount of a Group II-A metal-containing hydrolysis catalyst; and
   (3) at least about 1.5 moles of water for every mole of silane at a temperature of about room temperature to reflux temperature (approximately 25° to 160° C.) for about 1 to 10 hours to form thereby an organopolysiloxane prepolymer, and
(B) separating the resultant prepolymer product of step A from the reaction mixture to obtain a solvent-soluble further curable organopolysiloxane.

It is an object of the present invention to provide a method of hydrolyzing an organic trialkoxysilane monomer and ultimately preparing a thermoset organopolysiloxane from the hydrolyzed prepolymer product, the method including (A) heating a mixture of
   (1) a silane such as methyltrialkoxysilane, phenyltrialkoxysilane and mixtures of phenyltrialkoxysilane and methyltrialkoxysilane;
   (2) a Group II-A metal-containing hydrolysis catalyst such as barium hydroxide or calcium hydroxide in an amount equivalent to about 10 to 200 parts by weight of Group II-A metal per million parts of silane and water; and
   (3) at least about 1.5 moles of water per mole of silane, at a temperature of preferably about 75 to 85° C. for at least about one hour to form an organopolysiloxane prepolymer product; and
(B) curing the product of step A at about 90° to 300° C. or higher for at least about one minute to provide a hard, clear, acetone-resistant thermoset organopolysiloxane.

These and other objects will become apparent from the specification that follows and the appended claims.

The present invention provides a method of hydrolyzing an organic trialkoxysilane monomer and preparing a solvent-soluble further curable organopolysiloxane prepolymer therefrom, the method comprising the steps of:

(A) heating a mixture of
   (1) a silane which is selected from the group consisting of methyltrialkoxysilane, phenyltrialkoxysilane and mixtures of phenyltrialkoxysilane and methyltrialkoxysilane in which the alkoxy group contains from 1 to 6 carbon atoms;
   (2) an effective catalytic amount of a Group II-A metal-containing hydrolysis catalyst such as barium hydroxide; and
   (3) at least about 1.5 moles of water for every mole of silane at a temperature of about 50° to 160° C. for about 1 to 10 hours to form an organopolysiloxane partial condensation product prepolymer; and
(B) separating the resultant prepolymer from step A from the reaction mixture to obtain a solvent-soluble further curable organopolysiloxane.

The present invention also provides a method of hydrolyzing an organic trialkoxysilane monomer as above-described and preparing a thermoset organopolysiloxane from the solvent-soluble, further curable prepolymer by curing the prepolymer at about 90° to 300° C. or higher for at least one minute up to 168 hours or more to provide a hard, clear, chemical resistant, thermoset organopolysiloxane. The resultant polymers are excellent for making high temperature stable electrical insulation.

The preferred Group II-A metal-containing hydrolysis catalysts are Ba(OH)$_2$ and Ca(OH)$_2$. Other suitable catalysts are Sr(OH)$_2$ and Mg(OR)$_2$ where R is an alkyl radical of from 1 to 4 carbon atoms and preferably 1 carbon atom. The preferred Group II-A metal has an atomic weight between about 24.3 and about 137.4. Generally, at least a trace amount of the hydrolysis catalyst is necessary to obtain the controllable hydrolysis and, hence an amount in the neighborhood of as low as about 0.01 part per million to about 1 or 2 parts by weight of Group II-A metal per million parts of silane and water can be used to obtain benefits of the present invention. Usually, about 10 to 200 or 250 or 300 parts per million of the Group II-A metal content of the catalyst are used although the preferred range is about 20 to 100 parts per million. The optimum range is about 30 to 60 parts per million. When the amount of catalyst becomes greater than about 250 or 300 parts per million based on the Group II-A metal content of the catalyst, it generally is being used in excess of that needed which is costly.

Suitable trifunctional silane starting materials to provide the further curable prepolymers and the cured or thermoset polymers are methyltrialkoxysilanes, phenyltrialkoxysilanes, or mixtures of methyltrialkoxysilanes and phenyltrialkoxysilanes in which the alkoxy group has 1 to 6 carbon atoms and preferably 2 to 3 carbon atoms, with the best results being obtained when the alkoxy group is ethoxy.

When a mixture is used, the molar ratio of methyltrialkoxysilanes to phenyltrialkoxysilanes used is generally about 1:10 to 10:1, the preferred ratio being 1:4 to 4:1. For general molding, the preferred ratio of the two is about 2:1 and generally for coating applications, good results can be obtained using a ratio of about 1.5:1 to 2.5:1. A polymer for laminates in particular and also coatings and even flexible coatings can be made with molar ratios of preferably about 1:1.0 to 1:6.0 and more preferably about 1:4.

For flexible coating applications, the prepolymers can be dissolved in a solvent, cast and cured in place to provide outstanding coatings.

In general, solid prepolymers that are tack free at room temperature are prepared by:

(I) heating a mixture of
  (A) a silane that is methyltrialkoxysilane, phenyltrialkoxysilane, or mixtures of methyltrialkoxysilane and phenyltrialkoxysilane in which the alkoxy radical contains from 1 to 6 carbon atoms and preferably 2 to 3 carbon atoms; and
  (B) at least a trace of a Group II-A metal-containing hydrolysis catalyst and at least about 1.5 moles of water for every mole of total silane present, at a temperature preferably of about 65° to 85° C. for a period of time of from about 1 to about 10 hours; and (II) isolating the siloxane partial condensation product from step I by filtration.

The methyl and phenyl copolymers are preferably made by (I) heating a mixture of
  (A) from about 1 to about 2 moles of methyltriethoxysilane and from about 6 to about 1 mole of phenyltriethoxysilane;
  (B) from about 1.5 to about 3 or 4 moles of water for every mole of total silane present, there being at least a trace of and preferably at least about 20 parts by weight of a Group II-A metal-containing hydrolysis catalyst present in the reaction mixture per million parts of water and silane, at a temperature of about 80° C. for a period of time of from about 2 to about 6 hours; and
thereafter, the mixture is further processed by (II) filtration from reaction mixture and drying to provide a free-flowing powdered solid.

The homopolymer from the methyltrialkoxysilane or the phenyltrialkoxysilane is generally prepared by a method that includes heating under basic conditions a mixture of (A) a methyltrialkoxysilane or a phenyltrialkoxysilane wherein the alkyl portion of the alkoxy radical contains less than 4 carbon atoms and optionally from 0 to 5 mole percent, based on total silane reactant material, of at least a mono-, di-, tri-, or tetraalkoxysilane compound represented by the general formula

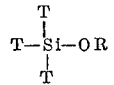

wherein R in the alkoxy radical —OR represents an alkyl radical having less than 4 carbon atoms such as methyl, ethyl and isopropyl, and each T independently represents an aryl, alkyl or alkenyl radical, each of which contains less than 7 carbon atoms, or the aforementioned alkoxy radical, —OR; and (B) from 1.5 to about 10 moles and preferably from 2 to about 4 moles of water per mole of total silane, said mixture containing by weight from about 10 to 200 parts of Group II-A metal in the form of Group II-A metal-containing hydrolysis catalysts such as barium hydroxide, per million parts of total silane and water, the heating of the said mixture to form a siloxane partial condensation product being continued for from 1 to 10 hours at temperatures of at least 50° C. while retaining in said mixture at least 1.5 moles of alkanol by-product per mole of silane starting material assuming complete hydrolysis of all alkoxy-silicon linkages in the liquid reaction mixture.

Unless otherwise noted, the viscosity in centipoises used herein is that measured with an RVF Brookfield viscometer in accordance with ASTM 2196–63T, "Rheological Properties of Non-Newtonian Liquids."

The following examples are intended to illustrate the present invention and not to limit the same in any way.

EXAMPLE 1

An organopolysiloxane prepolymer was prepared from a purified phenyltriethoxysilane monomer, the monomer being purified by distillation from an aqueous saturated sodium carbonate solution to about 0 part by weight of HCl per million parts of silane (i.e., no acid) to provide substantially a neutral monomer. The above-described monomer was hydrolyzed with water and a Group II-A metal-containing hydrolysis catalyst and condensed according to the formulation set forth below:

| Ingredients | Grams | Moles |
| --- | --- | --- |
| Phenyltriethoxysilane | 120 | 0.5 |
| Water | 27 | 1.5 |
| Calcium hydroxide | 0.0685 | (¹) |

¹ About 214 parts per million OH⁻ or about 252 parts per million calcium per million parts of silane plus water.

The above-described amount of purified phenyltriethoxysilane was charged into an 800 ml. 3-necked reaction flask equipped with a condenser, mechanical stirrer, thermometer and a Garman take-off. A saturated CaO solution was added in the amount of 27 grams, this amount of solution containing .0685 gram of calcium hydroxide. The hydrolysis mixture was heated in a preheated oil bath (120° C.) to about 90–98° C. After 2 to 3 hours of heating, the reaction pot temperature dropped to 79–80° C. At this point the hydrolysis reaction was considered completed. Thereafter, the reaction product was isolated by filtration or by stripping off 80–90% of the by-product ethanol (specific gravity .82). The resultant reaction product was added to cold methanol in a blender and vigorously stirred for several minutes, filtered and dried in a vacuum oven at 60–70° C. A white, fluffy, powdered, further curable prepolymer was obtained. The yield was close to that of the theoretical yield (64.5 grams).

The further curable polymer, which was solvent-soluble and meltable, was put into solution in xylene in an amount of about 48% by weight of solids and the viscosity was about 17 centipoises at 25° C. This xylene solution was used to coat aluminum panels by dipping the panels in the solution. The coatings were heat-cured at 200–300° C. at a film thickness of about 0.5 mil. Excellent hard, clear coatings were obtained which were acetone resistant.

The coatings survived 1% impact elongation tests. The coatings also passed the 10H pencil hardness test and the Scotch Tape test.

Laminates were prepared from the solution by dipping Style 181 E-glass cloth in the solution and air drying the dipped cloth for 2 hours. The cloth was then cut into squares 7″ x 7″; these were stacked to give 14 plies and the stack placed in a press heated to 400° F. Slight pressure was applied until the resin gelled (20 minutes) and then 500 p.s.i. for 30 minutes at 400° F. The press was then cooled to 200° F. and the laminate removed. A post cure of 2 hours at each of the following temperatures (110° C., 150° C., 180° C., 205° C., and 230° C.) and finally 12 hours at 250° C. was given. The resin content of this laminate was approximately 25% by weight. The flexural strength of the laminate was measured at room temperature and was found to be 31,000 p.s.i. The tangent modulus at room temperature was $3.1 \times 10^6$ p.s.i.

The above-mentioned impact elongation tests to determine the impact flexibility of the coatings were made with a G.E. impact flexibility tester. This instrument generally determines the relative flexibility of a paint, varnish or enamel film expressed as percentage elongation, in a range of 0.5 to 60% as based on the impact of a solid metal cylinder dropped through a guide track from a height of 4 feet onto the reverse side of a coated test panel. The end of the cylindrical impactor is studded with a group of spherical knobs varying in size and calibrated in terms of percent flexibility, based on the elongation or draw they can produce in a metal panel. A reading is made by observing the last indentation in ascending order to show no cracking of the coating.

The adhesion of the coating to metal substrate was tested with the Scotch Tape test wherein the tape is uniformly applied to a coated surface which has been cross-cut with a razor knife, then pulled off rapidly at 180°. Coatings which exhibit good adhesion do not peel, whereas those not bonded to the substrate peel in the cross-cut area where the coating is not continuous.

The 10H pencil hardness test is made by rubbing a 10H pencil point on the surface with slight pressure for a long enough time to deposit marks thereon. The marks are then rubbed with a tissue or cloth and if no evidence of the marks remain, the coating is deemed to pass the test.

EXAMPLE 2

A prepolymer was prepared as described in Example 1 and filled moldings made therefrom. The prepolymer was dissolved in benzene and the filler in the form of steel fibers (16 grams—75% by weight) was added slowly with mixing, 40 ml. of benzene being used as the solvent. The prepolymer was used in an amount of 4 grams or 25% by weight. Thereafter, the solvent was evaporated and the steel fiber/prepolymer mixture was pressed in a mold at 500 p.s.i. at 350° F. for 2 hours. The pressed mixture was post cured at 200° C. until a hard disc was obtained.

A filled disc of 70% by weight $Al_2O_3$ powder and 30% by weight of the prepolymer was prepared by pressing in a 5″ diameter mold at 400° F. and 2000 p.s.i. for 2 hours. A disc having a thickness of 153 mils was obtained, the disc having the following properties:

Properties:
  Flexural strength: 5000 p.s.i.
  Tangent modulus: $0.41 \times 10^6$ p.s.i.
  Compressive strength: 1580 p.s.i.
  Density: 2.242 grams per cc.
  Water absorption after 24 hours: 0.68% by weight A filled molded disc of 80% by weight of mica and 20% by weight of prepolymer was prepared in a similar manner. A good, somewhat hard disc was obtained having a density of 2.087 grams per cc. and the percent water absorption after 24 hours was only 0.267% by weight.

EXAMPLE 3

A phenyl prepolymer was prepared as described in Example 1 except that 0.010 gram of calcium oxide was used in place of the saturated calcium hydroxide solution, the amount of calcium oxide used being equivalent to about 42 parts per million OH. The resultant prepolymer has a much lower workable softening temperature in the neighborhood of 100–120° C. instead of 220–240° C. as was the case of the prepolymer of Example 1. The number average molecular weight of the prepolymer was about 2000 as obtained by vapor pressure osmometry. The ethoxyl content of the prepolymer was less than 1% by weight. The total reaction time in this example was 2 hours.

Coatings, laminates and moldings were prepared using the resultant prepolymer as described in Examples 1 and 2 and excellent products obtained.

EXAMPLE 4

A phenyl prepolymer was prepared as described in Example 1 except that strontium hydroxide was used as a hydrolysis catalyst in place of the saturated calcium hydroxide solution. The following formulation was used:

| Ingredients | Grams | Moles |
| --- | --- | --- |
| Phenyltriethoxysilane | 240 | 1 |
| Water | 54 | 3 |
| SrO | 0.032 | (¹) |

¹ Equivalent to about 42 parts per million OH based on the weight of silane plus water.

The softening point of the resultant prepolymer was observed to be 110–120° C., the ethoxyl content was less than 1% and the total yield was 134.2 grams.

The total reaction time for preparing the prepolymer was 2 hours and satisfactory coatings, laminates and moldings were prepared according to the methods described in Examples 1 and 2.

EXAMPLE 5

A phenyl prepolymer was prepared as described in Example 1 using barium hydroxide as the hydrolysis catalyst. The following formulation was used:

| Ingredients | Grams | Moles |
| --- | --- | --- |
| Phenyltriethoxysilane | 240 | 1 |
| Water | 54 | 3 |
| Ba(OH)$_2$·8H$_2$O | 0.117 | (¹) |

¹ Equivalent to about 0.0617 gram of Ba(OH)$_2$ which is also equivalent to 42 parts per million OH.

The reaction time was about 4 hours and the resultant prepolymer had a softening point of 100–110° C., an ethoxyl content of 2–3% and the yield was 135 grams. The number average molecular weight was 1800 by vapor pressure osmometry.

Satisfactory coatings, laminates and moldings were prepared from the prepolymer employing the methods described in Examples 1 and 2.

EXAMPLE 6

A phenyl prepolymer was prepared as described in Example 1 except that Mg(OCH$_3$)$_2$ was used as the hydrolysis catalyst in the place of the calcium hydroxide. The amount of Mg(OCH$_3$)$_2$ used was 0.4 gram or 0.005 mole.

The Mg(OCH$_3$)$_2$ was prepared by reacting magnesium filings with methyl alcohol in the presence of iodine.

In preparing the prepolymer, the catalyst and silane monomer were heated together at 90° C. for 30 minutes and then the water was added. The reaction mixture was heated for a total of 6 hours and a white solvent-soluble further curable prepolymer was obtained. The total yield was about 80%. Softening point of the prepolymer was 130–140° C. and the number average molecular weight was found to be 2500 by vapor pressure osmometry.

Excellent coatings, moldings and laminates were prepared as described in Examples 1 and 2.

EXAMPLE 7

A copolymer of phenyltriethoxysilane and methyltriethoxysilane was prepared using the methods described in Example 1 using calcium hydroxide as the hydrolysis catalyst. The molar ratio of phenyl to methyl was 5:1. The following formulation was used:

| Ingredients | Grams | Moles |
|---|---|---|
| Phenyltriethoxysilane | 240 | 1 |
| Methyltriethoxysilane | 35.6 | 0.2 |
| Water | 65 | 3.6 |
| CaO | 0.0203 | (1) |

[1] 36 parts per million OH based on total weight of reactants.

The procedure for the cohydrolysis of phenyltriethoxysilane and methyltriethoxysilane was similar to that described in Example 1.

All reagents except methyltriethoxysilane were heated to 90–95° C. in an oil bath. After a few minutes the reaction temperature began to drop and when this was below 90° C., the last reagent, methyltriethoxysilane, was added slowly. After 30 minutes, the addition was complete and the reaction was then completed when the pot temperature dropped down to 80° C.

The polymer was isolated from the reaction mixture by filtration and 149 grams were obtained which compares to a theoretical yield of 142.4 grams for the formula $Ph_5MeSi_6O_9$ where Ph means phenyl and Me means methyl. The precured copolymer was soluble in benzene, acetone, xylene, dioxane, dichlorobenzene and other aromatic and polar solvents. The softening temperature of the polymer was 140° C. and excellent coatings, laminates and moldings were prepared as described in Examples 1 and 2.

EXAMPLE 8

The methyl/phenyl copolymer was prepared as described in Example 7 except that barium hydroxide was used in the place of calcium hydroxide. The reaction time was between 5–6 hours and a white, solvent-soluble and meltable polymer was obtained. Satisfactory coatings, moldings and laminates were prepared as described in Examples 1 and 2.

As indicated in the above examples, the hydrolysis of phenyltriethoxysilane or mixtures of phenyltriethoxysilane and methyltriethoxysilane preferably is conducted with about 3 moles of water per mole of silane to provide solvent-soluble, further curable organopolysiloxanes.

The prepolymers generally can be cured at about 300° C. for several hours. The following data shows the weight loss from the prepolymers to the completely cured polymers.

| Prepolymer | Catalyst | Percent wt. loss cure at 300° C. for 36 hours | Percent wt. loss to cure calculated from T.G.A. 10° C./min. in air |
|---|---|---|---|
| Example No.: | | | |
| 6 | $Mg(OCH_3)_2$ | 3.2 | |
| 4 | $Sr(OH)_2$ | 6.0 | 6.4 |
| 5 | $Ba(OH)_2$ | 5.3 | 5.5 |
| 1 | $Ca(OH)_2$ | 4.9 | 6.2 |

The samples used in the above table had no further weight loss up to 500 hours, at 300° C. The T.G.A. test (Thermal Gravimetric Analysis) shows the comparative weight loss values for the prepolymers, the results indicating that the degradation begins in the neighborhood of 460–500° C.

The softening point of the prepolymer generally is in the range of about 60 or 80° up to 250° C. and, for the preferred prepolymers, is about 100° to 120 or 140° C.

As indicated in the examples, the prepolymers are soluble in solvents such as n-butanol, xylene, benzene, dioxane, trichlorobenzene, benzonitrile, diphenyl ether, etc. and solutions thereof can be used to prepare excellent coatings.

In the above examples, other Group II–A metal-containing hydrolysis catalysts previously described as suitable can be used for all or part of the hydrolysis catalyst used to provide substantially similar results. In the above working examples, the amount of Group II–A metal present in the catalyst was 252 parts per million (p.p.m.) Example 1), 56 p.p.m. (Example 3), 109 p.p.m. (Example 4), 176 p.p.m. (Example 5), 880 p.p.m. (Example 6), 114 p.p.m. (Example 7), and 143 p.p.m. (Example 8). Also in the above examples, the silane monomers described as suitable can be used in place of all or part of the silane monomers used in the working examples It is to be understood that various modifications of the invention herein described may be made without departing from the spirit and scope thereof.

What is claimed is:

1. A method of hydrolyzing an organic trialkoxysilane monomer and preparing a solvent soluble further curable organopolysiloxane prepolymer therefrom, the method comprising the steps of:
    (A) heating a mixture of
        (1) a silane which is selected from the group consisting of methyltrialkoxysilane, phenyltrialkoxysilane and mixtures thereof in which the alkoxy group contains 1 to 6 carbon atoms;
        (2) an effective catalytic amount of a Group II–A metal hydroxide catalyst; and
        (3) at least about 1.5 moles of water for every mole of silane at a temperature of about 50° to 160° C. for about 1 to 10 hours to form an organopolysiloxane partial condensation product prepolymer; and
    (B) separating from the reaction mixture the resultant prepolymer from step A to obtain a solvent-soluble further curable organopolysiloxane.

2. A method of hydrolyzing an organic trialkoxysilane monomer and preparing a thermoset organopolysiloxane therefrom, the method comprising the steps of:
    (A) heating a mixture of
        (1) a silane which is selected from the group consisting of methyltrialkoxysilane, phenyltrialkoxysilane and mixtures thereof in which the alkoxy group contains 1 to 6 carbon atoms;
        (2) an effective catalytic amount of a Group II–A metal hydroxide catalyst; and
        (3) at least about 1.5 moles of water for every mole of silane at a temperature of about 50° to 160° C. for about 1 to 10 hours to form an organopolysiloxane partial condensation product prepolymer; and
    (B) curing the product of step A at about 90° to 300° C. for at least about one minute to provide a thermoset organopolysiloxane.

3. A method as defined in claim 1 in which the product of step B is further condensed at about 90° to 200° C. to provide an organic solvent-soluble, further curable organopolysiloxane.

4. A method as defined in claim 3 in which the further curable organopolysiloxane is a solid.

5. A method as defined in claim 1 in which the silane is phenyltriethoxysilane.

6. A method as defined in claim 1 in which the silane is methyltriethoxysilane.

7. A method as defined in claim 1 in which the silane is a mixture of methyltriethoxysilane and phenyltriethoxysilane.

8. A method as defined in claim 1 in which the hydrolysis catalyst is used in an amount of about 1 to 300 parts by weight of Group II–A metal per million parts by weight of silane and water.

9. A method as defined in claim 8 in which the hydrolysis catalyst is used in an amount of about 20 to 100 parts by weight of Group II–A metal per million parts of silane and water.

10. A method as defined in claim 1 in which the heating of step A is at least about 80° C. for about 1 to 4 hours.

11. The method as defined in claim 1 in which the hydrolysis catalyst is Ba(OH)$_2$.

12. A method as defined in claim 1 in which the catalyst is Ca(OH)$_2$.

13. A method as defined in claim 1 in which the catalyst is Mg(OR)$_2$ where R is an alkyl radical of 1 to 4 carbon atoms.

14. A method as defined in claim 13 in which the R is CH$_3$.

15. A method as defined in claim 1 in which the hydrolysis is Sr(OH)$_2$.

16. The method as defined in claim 1 wherein the Group II–A metal has an atomic weight between about 24.3 and about 137.4.

References Cited

UNITED STATES PATENTS 3,433,764   3/1969   Walmsley _____ 260—46.5

HOSEA E. TAYLOR, Primary Examiner

M. I. MARQUIS, Assistant Examiner

U.S. Cl. X.R.

117—135.1 R; 161—93 R, 193 R; 252—63.7 R; 260—30.45 B, 32.4 R, 332.25 B, 33.65 B, 33.85 B, 3375 B, 46.5

PO-1050
(5/69)

UNITED STATES PATENT OFFICE
CERTIFICATE OF CORRECTION

Patent No. 3,642,693      Dated February 15, 1972

Inventor(s) AMY L. JASINSKI

It is certified that error appears in the above-identified patent and that said Letters Patent are hereby corrected as shown below:

Column 9, line 18, before "is" insert - - catalyst - -

Signed and sealed this 3rd day of April 1973.

(SEAL)
Attest:

EDWARD M. FLETCHER, JR.      ROBERT GOTTSCHALK
Attesting Officer      Commissioner of Patents